April 21, 1964  A. C. FARLEY ETAL  3,129,657
COMBINATION TRANSFER AND COMPACTING APPARATUS
Filed May 29, 1963  9 Sheets-Sheet 1

INVENTORS.
Arthur C. Farley, Harley E. Kelchner,
Joseph W. Lee & Earl C. Alcott, Jr.
BY Paul & Paul
ATTORNEYS.

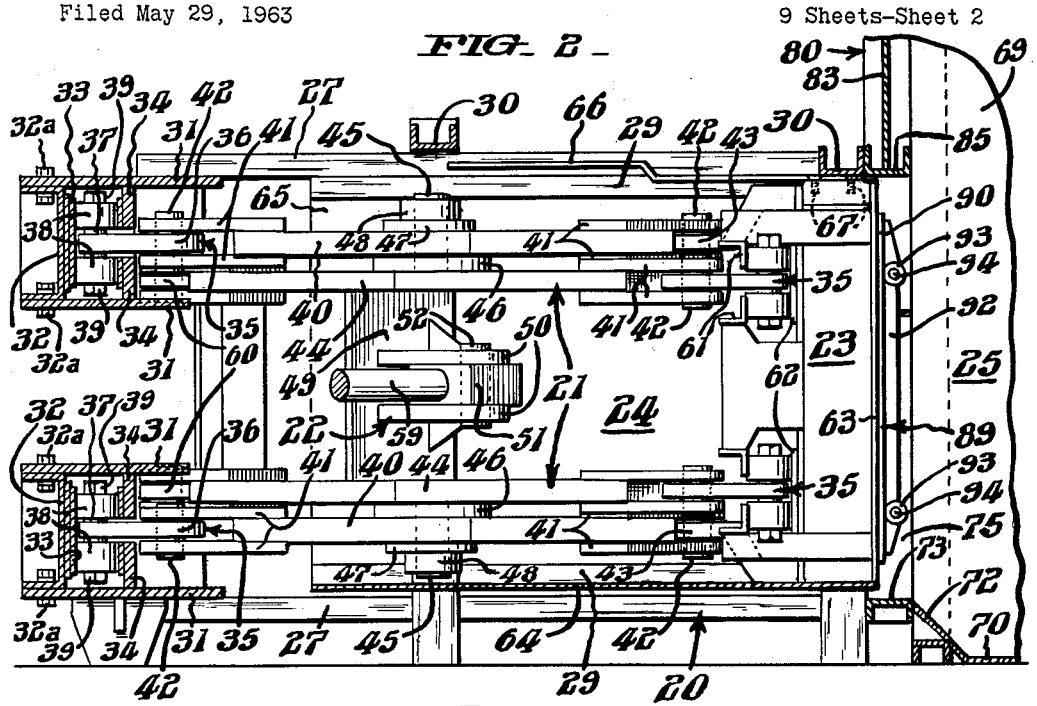
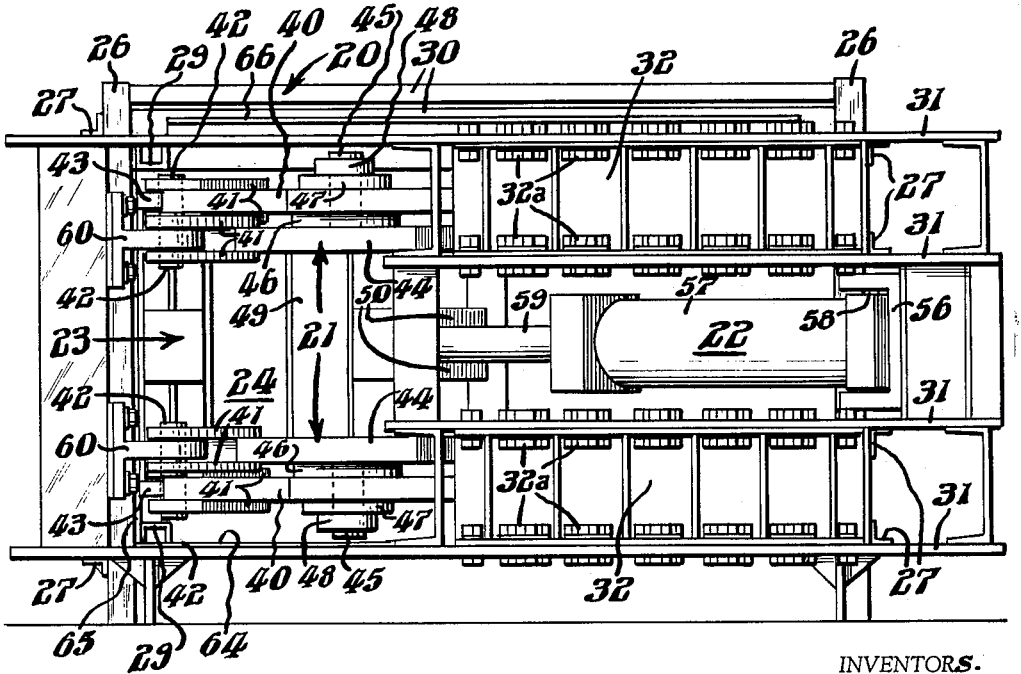

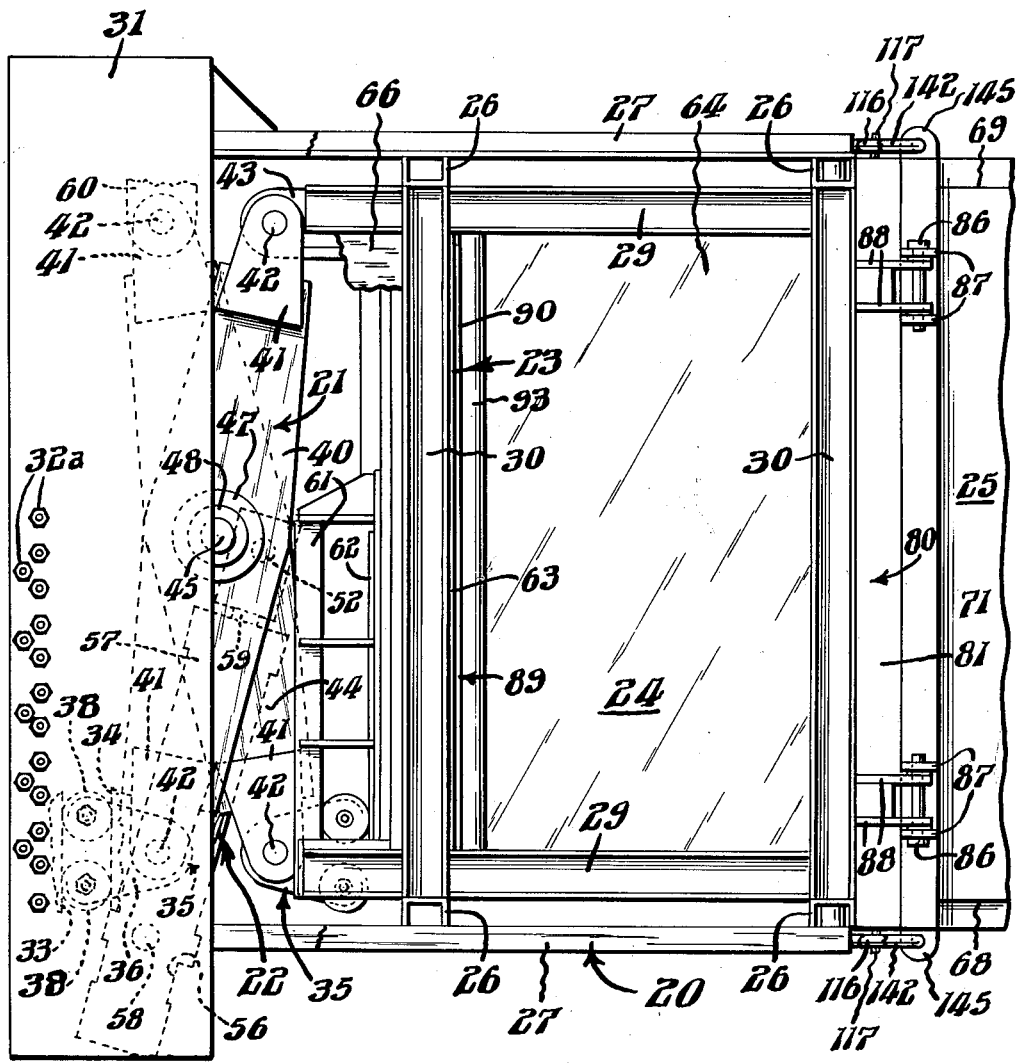

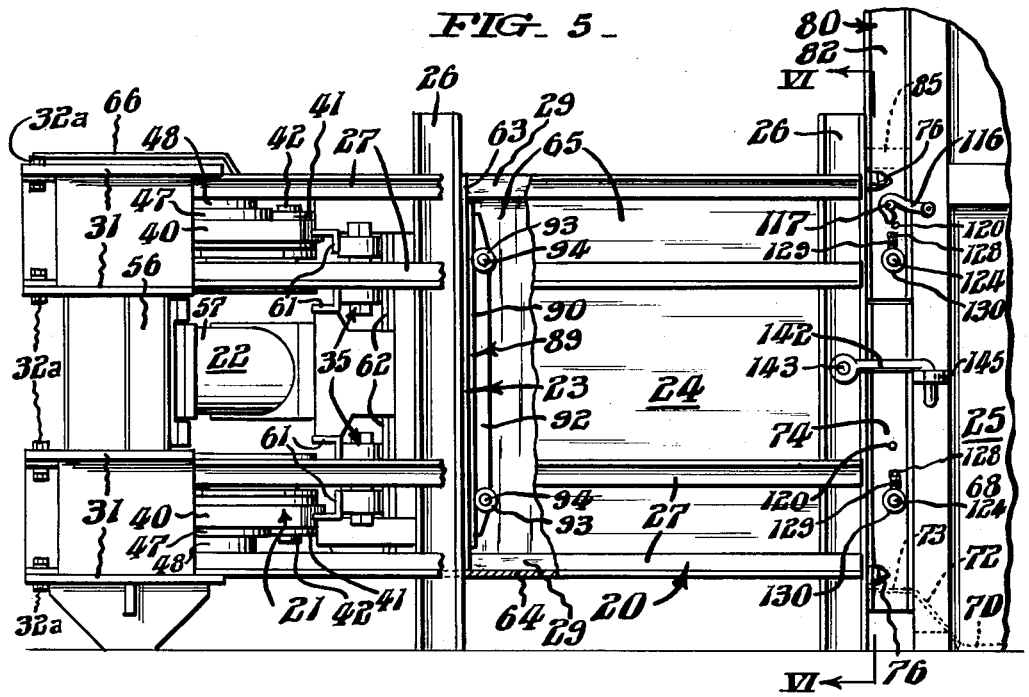
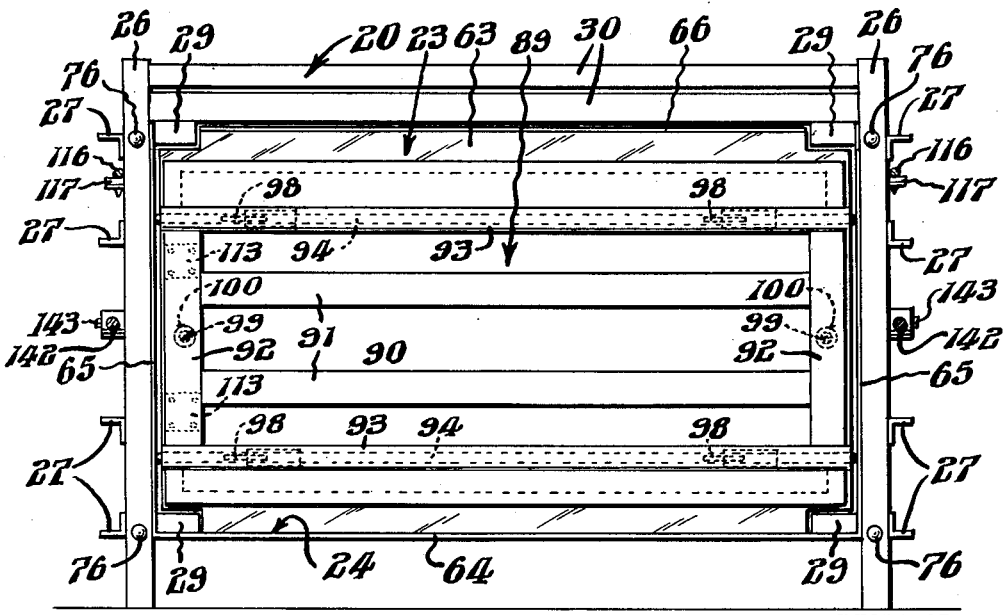

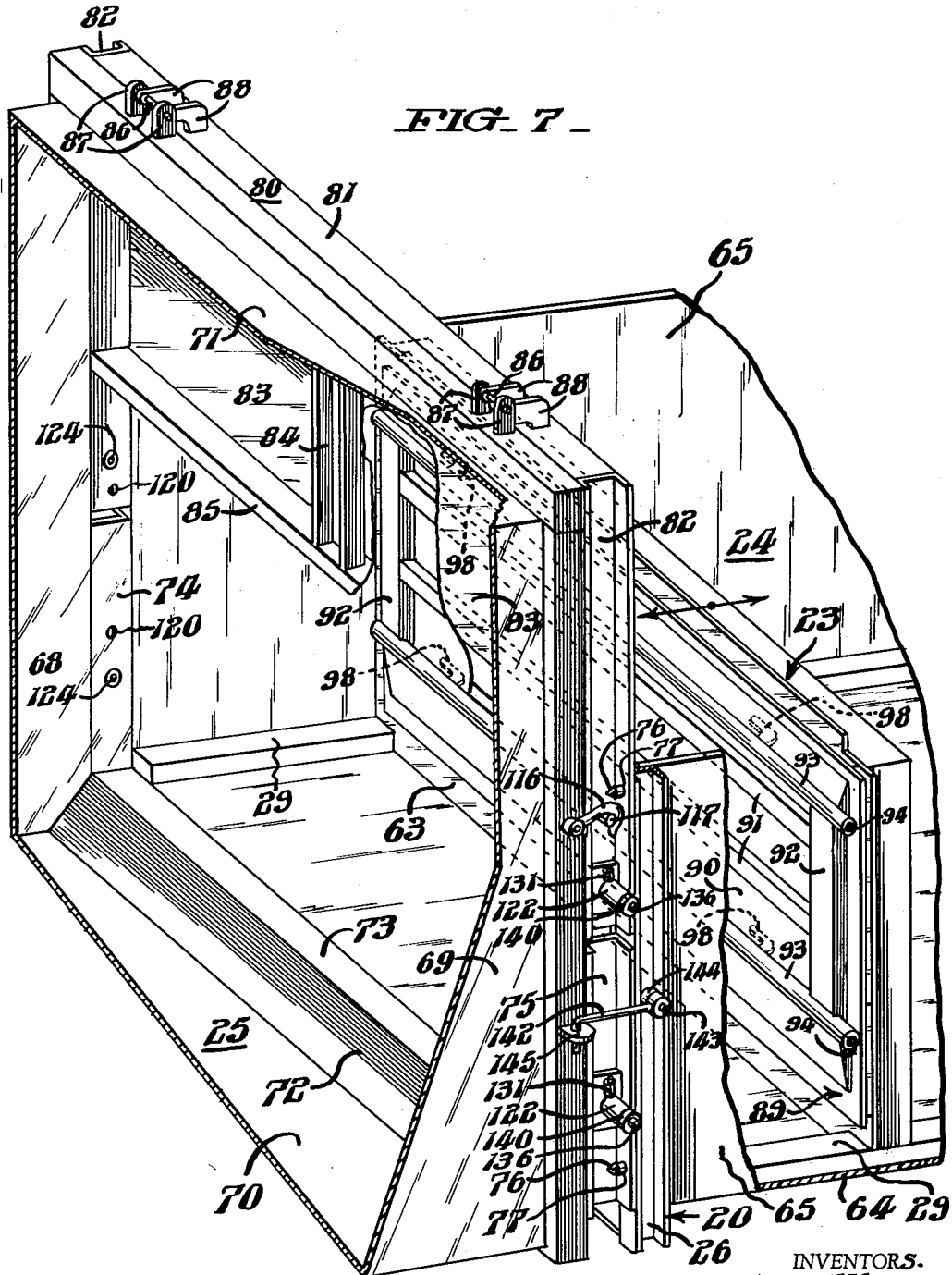

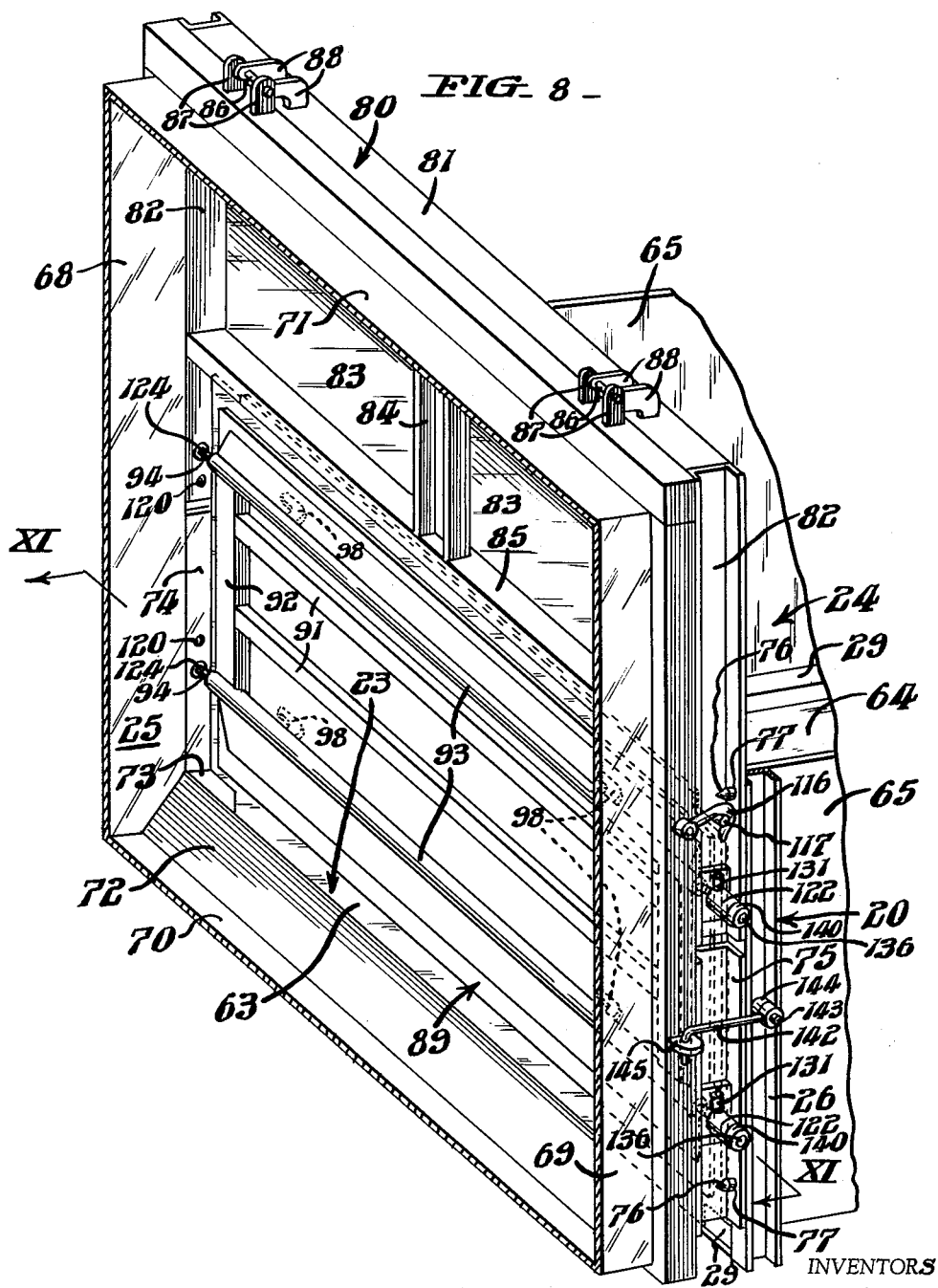

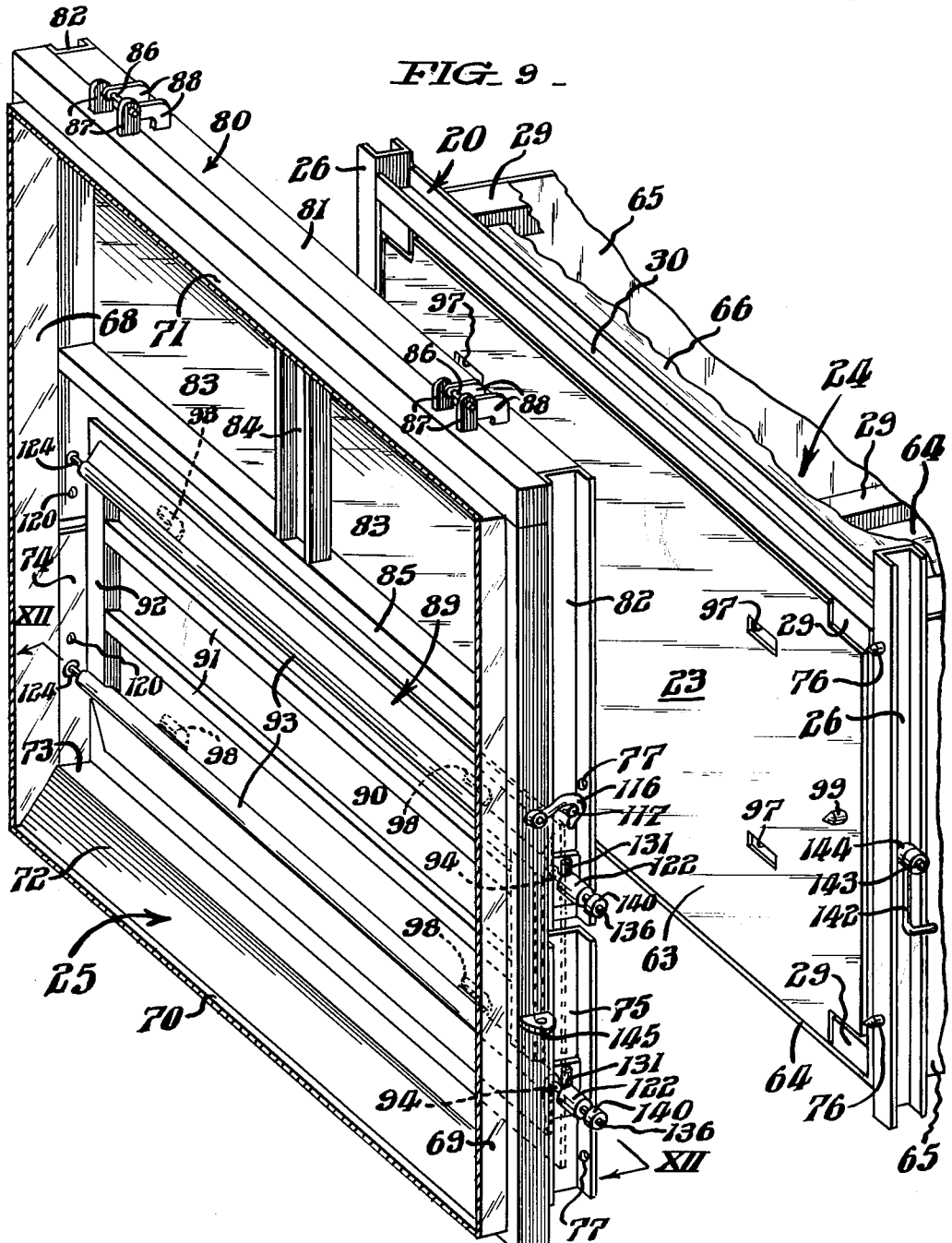

April 21, 1964  A. C. FARLEY ETAL  3,129,657
COMBINATION TRANSFER AND COMPACTING APPARATUS
Filed May 29, 1963  9 Sheets-Sheet 8

INVENTORS.
Arthur C. Farley, Harley E. Kelchner,
Joseph W. Lee & Earl C. Alcott, Jr.
BY Paul & Paul
ATTORNEYS.

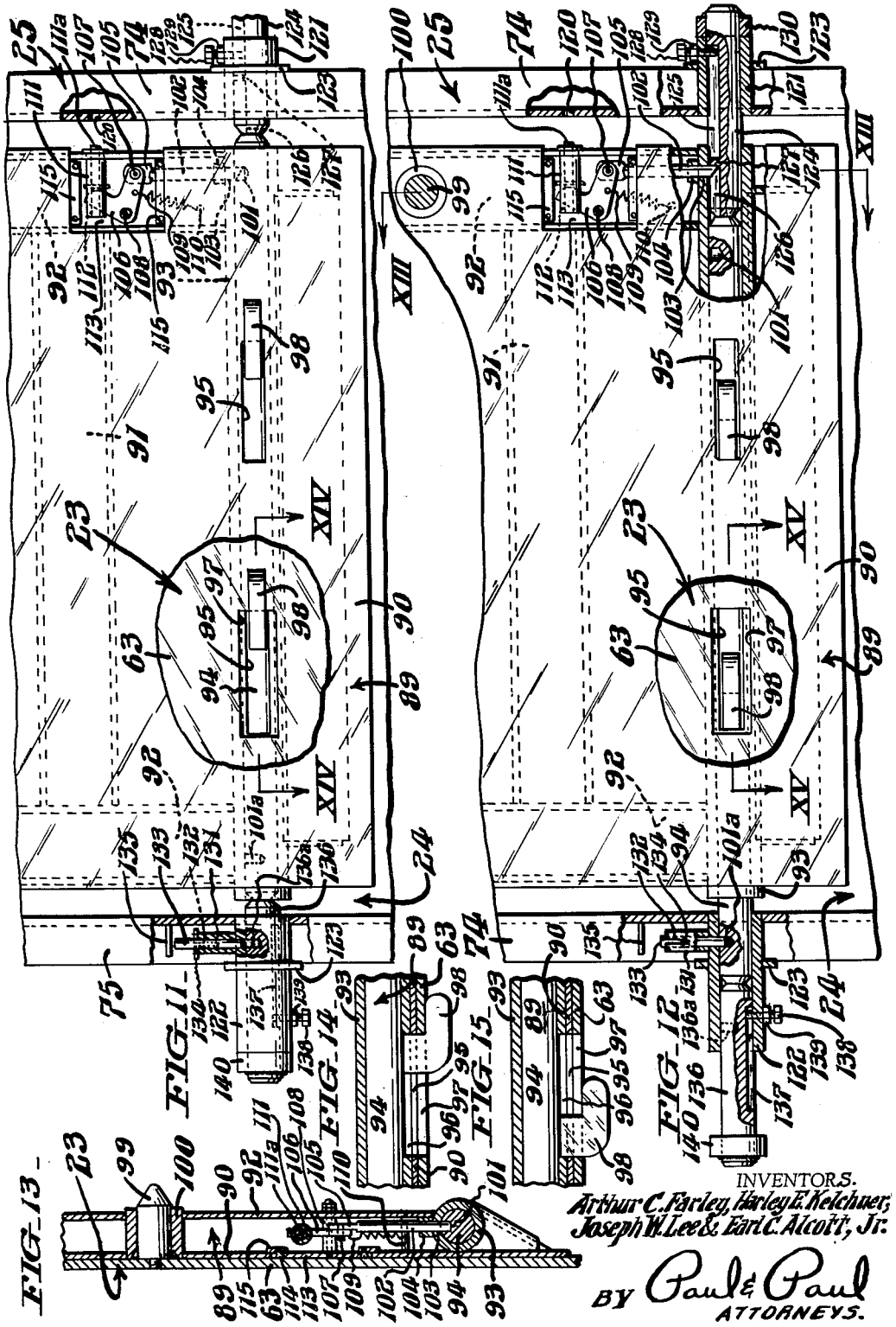

United States Patent Office 3,129,657
Patented Apr. 21, 1964

3,129,657
COMBINATION TRANSFER AND COMPACTING APPARATUS
Arthur C. Farley, Philadelphia, Harley E. Kelchner, King of Prussia, Joseph W. Lee, Philadelphia, and Earl C. Alcott, Jr., Lansdale, Pa., assignors to North American Compactor Corporation, Hatfield, Pa., a corporation of Pennsylvania
Filed May 29, 1963, Ser. No. 284,162
5 Claims. (Cl. 100—214)

This invention pertains to compressible refuse disposal systems, and more particularly, it pertains to novel apparatus for the compaction and transfer in the compacted state of compressible refuse.

Modern industry has been faced with an ever increasing burden with respect to the disposal of compressible refuse, such as paper, plastic, light wooden structures and the like. Heretofore, it has been common in many industries to incinerate such refuse. However, increased local governmental legislation concerning air pollution has forced many persons to refrain from such practices. Therefore, the common trash hauling operation has been utilized more and more for the disposal of this type of refuse. With the increasing production and concomitant waste of industry, trash haulers have developed various means for compacting compressible refuse prior to the ultimate haul to a remote dump for disposal. Among the system developed heretofore for this purpose is the vehicle mounted compaction apparatus which proceeds from location to location from where deposits of trash are picked up and compacted by the vehicle mounted apparatus, whereby finally the compacted load with the mounted apparatus proceeds to the dump and the load is discharged. This system has a disadvantage in that many vehicles must be equipped with expensive and complicated built-in compaction equipment, which equipment is necessarily useless during the trip to the disposal area and return. Another known system involves an initial pick-up of uncompacted trash and transfer thereof to a compaction center serving many pick-up units. At the compaction center accumulated refuse is periodically compacted by large mechanisms into disposal vehicles having great capacities. These disposal vehicles are then periodically taken to disposal areas for bulk discharge. Although this system obviates the necessity for vehicle mounted compaction equipment, the initial producer of refuse must continue to provide interim storage for the refuse, and the initial transporting vehicles must carry uncompacted refuse, an uneconomical operation.

It is therefore an object of this invention to provide apparatus adapted to obviate the above mentioned problems.

It is another object of this invention to provide apparatus for the compaction and transfer in the compacted state of compressible refuse, whereby the principal compaction elements of the apparatus are maintained only at the source of refuse.

It is another object of this invention to provide such apparatus which involves a minimum of storage space for accumulated refuse.

It is another object of this invention to provide such apparatus which is adapted to utilize portable and interchangeable containers for the compacted refuse.

It is another object of this invention to provide such apparatus wherein the transfer element thereof is equipped with features permitting the safe discharge of compacted refuse therefrom.

It is another object of this invention to provide such apparatus which necessitates the provision of a minimum amount of plant area for the compaction elements of the apparatus.

Other objects and advantages of this invention will readily become apparent from the following description and drawings, wherein:

FIGURE 2 is a sectional view taken along the lines and in the direction of the arrows II—II of FIGURE 1;

FIGURE 3 is a left end view of the apparatus shown in FIGURE 1;

FIGURE 4 is a top plan view of the apparatus shown in FIGURE 1, parts thereof being shown in a retracted position, and parts being broken away to show certain details thereof;

FIGURE 5 is a side elevational view of the apparatus as shown in FIGURE 4, certain parts being broken away to show details thereof;

FIGURE 6 is a sectional view taken along the lines and in the direction of the arrows VI—VI in FIGURE 5;

FIGURE 7 is a diagrammatic perspective view of the apparatus of this invention illustrating one stage in the operation thereof;

FIGURE 8 is a view similar to FIGURE 7 illustrating another operational stage;

FIGURE 9 is a view similar to FIGURE 7 illustrating another operational stage;

FIGURE 11 is a sectional view taken along the lines and in the direction of the arrows XI—XI in FIGURE 8 of the apparatus of this invention, parts being broken away to show greater detail;

FIGURE 12 is a view similar to FIGURE 11 taken along the lines and in the direction of the arrows XII—XII in FIGURE 9, showing an alternate position of certain elements of the apparatus of this invention;

FIGURE 13 is a sectional view taken along the lines and in the direction of the arrows XIII—XIII of FIGURE 12;

FIGURE 14 is a sectional view taken along the lines and in the direction of the arrows XIV—XIV of FIGURE 11; and FIGURE 15 is a sectional view taken along the lines and in the direction of the arrows XV—XV of FIGURE 12.

Figure 1:
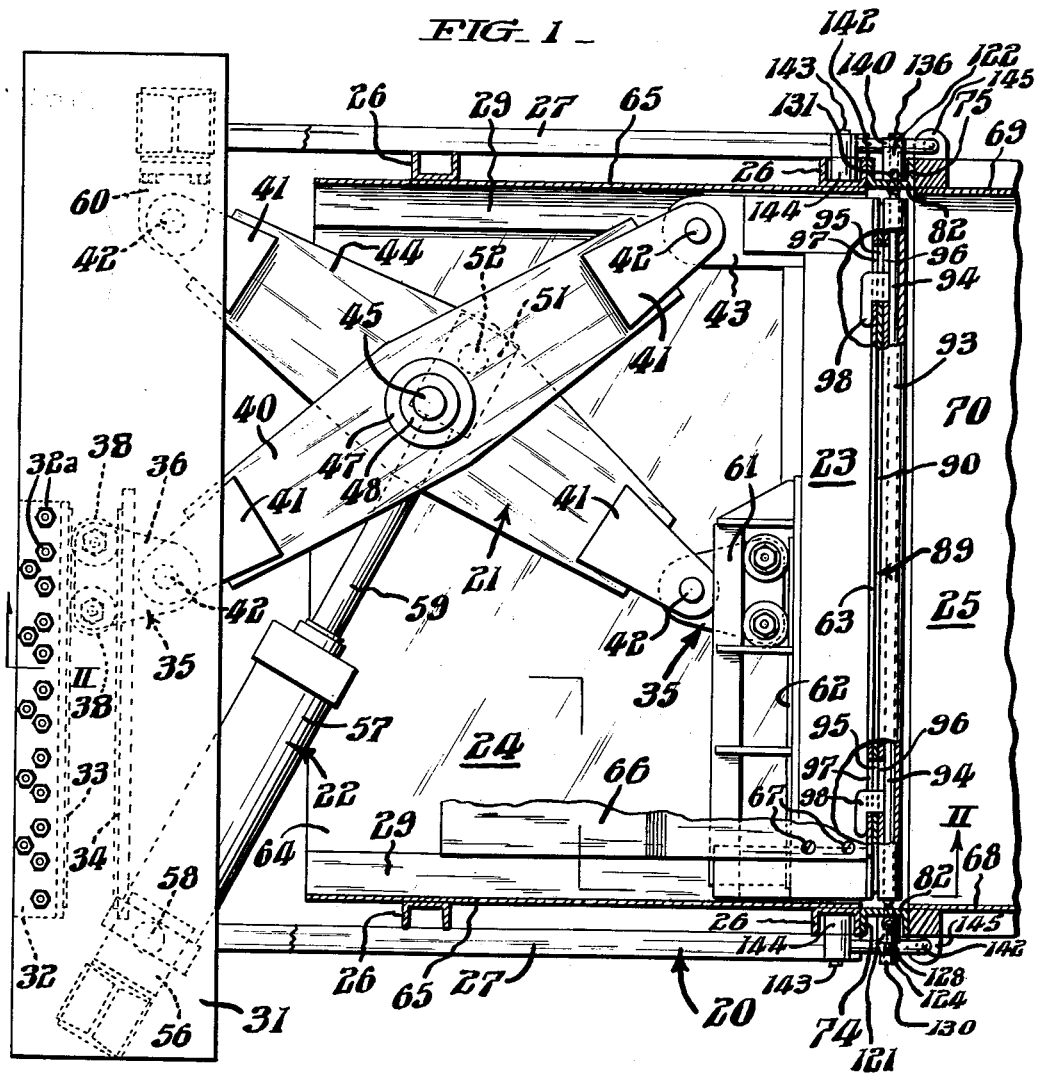
FIGURE 1 is a top plan view of the compaction and transfer apparatus of this invention, parts being broken away to show certain details thereof.

Referring now to FIGURES 1, 2 and 3, the apparatus of this invention is shown as consisting generally of a reinforced frame assembly 20, a crossed parallel arm assembly 21, a cylinder-piston unit 22, a pusher plate assembly 23, a compaction chamber 24, and a transfer container 25. The elements of the frame assembly 20 are suitably welded to withstand the design pressures for compaction apparatus, based on the specific size of the equipment, and comprise a plurality of vertical channel members 26, horizontal side channel members 27, longitudinal horizontal channel members 29, transverse horizontal channel members 30, and two pair of backup plates 31. Each pair of backup plates 31 is supported partially by a webbed channel 32, the combined plates 31 and channels 32 being reinforced by a plurality of nut and bolt fasteners 32a. The inner facing surface of the webbed channel 32 has affixed thereto a build-up flat bearing member 33. Similarly, spaced between said pairs of backup plates 31, are built-up split flat bearing members 34, which are parallel to bearing members 33 and coextensive therewith.

Between each opposing bearing member 33 and split bearing member 34 is mounted in rolling relation thereto a hanger assembly 35, which comprises a generally triangularly shaped hanger plate 36, a plurality of roller axles 37, and a pair of rollers 38 rotatably supported at the opposite ends of the axles 37, the rollers being secured by nuts 39. Each hanger assembly 35 is pivotally affixed to the free end of a driven arm 40, part of the parallel arm assembly 21, by means of a clevis 41 and pin 42. The opposite end of each driven arm 40 is pivotally attached to a mount 43, formed integrally with the pusher plate assembly 23, at the back face thereof, by means of a similar clevis 41 and pin 42. The pair of driven arms 40 are mounted outwardly of a pair of drive arms 44, the respective driven arms being pivoted at their centers on a cylindrical trunnion pin 45, said pin being secured in a boss 46 formed on each drive arm 44. The pins 45 extend through journal bores formed in driven arms 40, driven arm bosses 47, and retainers 48. A brace 49 is welded to the drive arms 44 and supports the parallel arm assembly 21 as shown. A pair of identical plates 50 are welded to brace 49 in the opposed manner shown, and parallel to the arms 40, 44. Plates 50 pivotally support a rod eye 51 therebetween by means of a rod eye pin 52, which is journalled in aligned bores of the plates 50 and the rod eye 51. One end of the drive arms 44 is pivotally attached to a drive arm mount 60 by means of a clevis 41 and pin 42, while the opposite end of each drive arm 44 is pivotally attached to a hanger assembly 35. The hanger assemblies 35 attached to the drive arms 44 are mounted in rolling relation to split bearing brackets 61 and coextensively opposed built-up flat bearings 62, which bearings are affixed to the back of the pusher plate assembly 23. The forwardmost part of the pusher plate assembly 23 is the face plate 63, the remainder of the assembly 23 being constructed of suitably reinforced metal structure, so as to withstand great compaction pressures.

The cylinder piston unit 22 is attached to a cylinder base 56, to which the cylinder 57 of the unit 22 is attached by means of a pivot pin 58. The piston 59 terminates in the rod eye 51.

The compaction chamber 24 is constructed of sheet metal and comprises a bottom wall 64, and opposed side walls 65, and is supported by the frame assembly 20, including vertical channel members 26. It will be apparent from FIGURES 1 and 4 that when the cylinder piston unit 22 is actuated by hydraulic controls (not shown), to alternately extend and withdraw the piston 59, the pusher plate assembly 23 is cycled between the positions shown in FIGURES 4 and 1, while at the same time the parallel arm assembly is alternately collapsed and expanded, resulting in rolling displacement of the hanger assemblies 35. It will be apparent that material placed in the compaction chamber 24 while the pusher plate assembly is in the position shown in FIGURE 4, will be subject to the pressure transmitted to that assembly by the combination of the cylinder-piston unit 22 and the parallel arm assembly 21. As the proportions of the cylinder piston unit and parallel arm assembly 21 shown in the drawing are those of an actual embodiment of the apparatus of this invention, it will also be apparent that the moment of force about the drive arm mounts 60 will increase as the pusher plate assembly 23 is moved from the position of FIGURE 4 to the position of FIGURE 1, thereby making available a greater force transmitted through the pusher plate 63 as the position of FIGURE 1 is approached. The importance of this feature will be explained hereinafter. In operation, a cover plate 66 is attached to the pusher plate assembly 23, as for example, by screws 67. The cover plate 66 is arranged parallel to the bottom wall 64, and serves to cover the internal apparatus during operation thereof.

Referring now to FIGURES 1–5 and 7, it is seen that the transfer container 25 is formed partly of a side wall 68, a side wall 69, a bottom wall 70, and a top wall 71. A portion of the bottom wall 70 is formed as an upturned portion 72. A channel shaped sill 73 is welded coextensively with the edge of the upturned portion 72, and two vertical channel sections 74, 75 are welded to a portion of the edge of the corresponding walls 68, 69. As shown, the channel sections 74, 75 are adapted to be abutted to vertical channel members 26. An exact registration between the container 25 and the frame assembly 20 is maintained by means of the cone-headed studs 76 projecting from the vertical channel members 26, two of which studs 76 register in apertures 77 formed in the channel sections 74, 75 (see also FIGURES 6 and 10). The remainder of the container 25 (not shown) constitutes a closed structure capable of withstanding great compaction pressures from within. The single opening of the container 25 is covered to a certain extent by a partial door 80, which comprises a top cross member 81, side channels 82, panels 83, brace 84 and a transverse support 85. The side channels 82 are also formed with apertures 77 therein, which apertures register with two additional studs 76 projecting from vertical channel members 26. The door 80 is hinged about pivot rods 86, which are in turn supported by spaced brackets 87. Two pair of L-shaped plates 88 are attached to the top cross member 81, and are pivotally disposed upon rods 86. A hook 116 is swingably mounted on the transfer container 25 at each side thereof in gripping juxtaposition to a lug 117 mounted near the lower end of each of the side channels 82.

Referring now to FIGURES 1, 2, 6, 7 and 8, a transfer plate 89 is shown attached to the pusher plate 63. Details of the separate transfer plate 89 are shown in FIGURES 10–15. The transfer plate 89 is built up from welded sections and includes a back plate 90, transverse supports 91, vertical supports 92 and a pair of tubes 93. Each tube 93 has a close-fitting cylindrical bar 94 sleeved therein. Two pair of spaced slots 95 are formed in the back plate 90, each pair being aligned with the axis of a corresponding tube 93. Mating pairs of tube slots 96 are formed in the tubes 93, as shown more clearly in FIGURES 14 and 15, and corresponding slots 97 are formed in the face plate 63. Each bar 94 has projecting therefrom a pair of L-shaped dogs 98, each dog being sized and oriented so as to pass through the juxtaposed and identically shaped slots 95, 96, 97. From FIGURES 11, 12, 14 and 15, it will be apparent that in one of the positions shown, the dogs 98 lock the transfer plate 89 to the face plate 63 of the pusher plate assembly 23, while in the other position the transfer plate 89 and face plate 63 are unlocked. When so locked, transfer plate 89 is carried by the pusher plate assembly 23, as shown in FIGURES 1 and 2. To aid registration of the transfer plate 89 and face plate 63 a pair of indexing pins 99 are mounted on the pusher plate 63 for registration with a pair of mating chamfered sleeves 100 mounted in the transfer plate 89 each pin 99 and the cooperating sleeve 100 being spaced laterally of their respective members.

Referring to FIGURES 11, 12 and 13, it is seen that each bar 94, has bored depressions 101 and 101a formed proximate each end thereof. With the bar 94 positioned as shown in FIGURE 11, it is seen that a vertical pin 102 registers in depression 101, through an opening 103 formed in tube 93, and a bored boss 104. The pin 102 is positioned mediate the back plate 90 and a vertical support 92, and includes a flattened portion 105, which is in turn pivotally connected to a rocker cam 106 about a pivot 107. Rocker cam 106 is in turn pivoted about a transverse pin 108, which is supported in both back plate 90 and a vertical support 92. A tensioned spring 109 is attached to the rocker cam 106 at a point mediate of the transverse pin 108 and the pivot 107, the other end of the spring 109 being attached to a fixed pin 110 supported athwart the back plate 90 and vertical support 92. A tube 111 is inserted through the side wall of the vertical support 92 and has a transverse slot 112 formed at one end thereof which accommodates the thickness of rocker cam 106 as shown in FIGURES 11 and 12. A pin 111a is shiftably disposed within the tube 111. The mechanism just described is normally covered by a cover plate 113, affixed by screws 114 to ledges 115.

Opposite the bore of each tube 111, in the corresponding side channel 74 and 82, is formed an opening 120. Opposite the bore of each tube 93, and at each end thereof, in the adjacent side channels 74 and 75, are mounted stub tubes 121, 122. Tubes 121, 122 are braced in axial alignment with tubes 93 by means of brace plates 123. The stub tubes 121 are each complemented by a stub bar 124, frictionally held therein. As shown in FIGURE 12, the stub bar 124 has a closed-end slot 125 formed mediate the ends thereof, and an open end slot 126 formed adjacent one end thereof, whereby a detent 127 separates the slot 125 from the slot 126. A positioning screw 128 is threaded through a tapped opening in the wall of stub tubes 121 and held in position in slot 125 by a nut 129. A cap ring 130 encompasses the stub bar at the end thereof opposite the open-end slot 126, and is welded thereto.

Each of the stub tubes 122 has mounted thereon a vertical tube 131, having a transverse slot 132 cut therein, and a lift pin 133 sleeved therein. Pin 133 has a transverse dog 134 crossed therethrough, whereby the pin 133 may be oriented alternatively as shown in FIGURES 11 and 12. A keeper 135 prevents complete withdrawal of the pin 133 from the tube 131. The stub tubes 122 are each complemented by a stub bar 136, frictionally held therein and which has a depression 136a formed therein. As shown in FIGURE 12, the stub bar 136 has a closed-end slot 137 formed mediate the ends thereof, and is retained by a positioning screw 138 threaded through a tapped opening in the wall of the stub tube 122 and held in position by a nut 139. Each stub bar 136 is encompassed by a cap ring 140, which is welded thereto.

A pair of retaining hooks 142 are swingably mounted on the pivot extension 143 of a pair of bosses 144 formed on a vertical channel member 26 at either side of the frame assembly 20, and adjacent the transfer container 25. The hooks 142 are adapted to register with a pair of apertured ears 145 affixed to and projecting from either side of the frame of the transfer container 25, as clearly shown in FIGURES 4, 8 and 9.

In operation, the elements of the apparatus of this invention are first arranged as shown in FIGURES 4, 5 and 6. As there is shown, the transfer container 25, which is adapted to be lifted and carried in a conventional manner by a suitable trash carrying vehicle, is in registry with the frame assembly 20, such registration being aided by studs 76 and apertures 77 as hereinbefore described. The hooks 142 prevent separation of the transfer container during the compaction procedure. The parallel arm assembly is initially in the collapsed stage shown in FIGURE 4, thereby establishing an initial position for the pusher plate assembly 23 including the transfer plate 89, which, at this stage, is locked thereto as hereinbefore described (shown schematically in FIG. 6). Looking at the apparatus from the top (FIG. 4), it is therefore seen that an open topped chamber 24 defined by the adjoining members 29, 30, the transfer plate 89, side walls 65 and bottom wall 64 is presented, which chamber is adapted to receive a load of compressible waste material to be compacted. When sufficient material has accumulated within the chamber 24 in this manner, the cylinder-piston unit 22 is activated by hydraulic controls (not shown) so as to extend the piston 59 from the cylinder 57, thereby expanding the parallel arm assembly 21 to the position shown in FIGURES 1, 2 and 3. It will thus be realized that any compressible material, which was initially in the chamber 24, has now been forced into the transfer container 25 by the pusher plate assembly 23. In passing from the position of FIGURE 4 to the position of FIGURE 1, the hanger assemblies 35 travel from end to end of the bearing members 33, 34, 61, 62 by means of the rollers 38. This motion likewise draws the cover plate 66 into the position shown in FIGURE 1, whereby deflecting means is provided against trash material lodging in back of the pusher plate assembly 23 and amidst the parallel arm assembly 21. To prepare for another compaction cycle, the cylinder piston unit 22 is again hydraulically activated to withdraw piston 59 into the cylinder 57, restoring the apparatus to the position shown in FIGURE 4. This completes one compaction cycle, and as many cycles may be effected as are necessary to fill the transfer container 25 to the desired degree of compaction. Since the only material compacted outside of the transfer container 25 during each cycle will be fresh uncompacted material, it is seen that great force is only required as the pusher plate assembly 23 approaches the position shown in FIGURE 1, at a time when the transfer container is sufficiently packed with compacted material to offer substantial resistance to the pusher plate assembly 23 and its activating parallel arm assembly 21. Therefore, the importance of the varying mechanical advantage of the parallel arm assembly shown is obvious, as hereinbefore explained. A perspective view of the compaction cycle is best seen in FIGURE 7, the relative motion being indicated by the double headed arrow. Conventional bearings (not shown) are suitably provided to aid movement of the pusher plate assembly 23 across the bottom wall 64.

Figure 10:
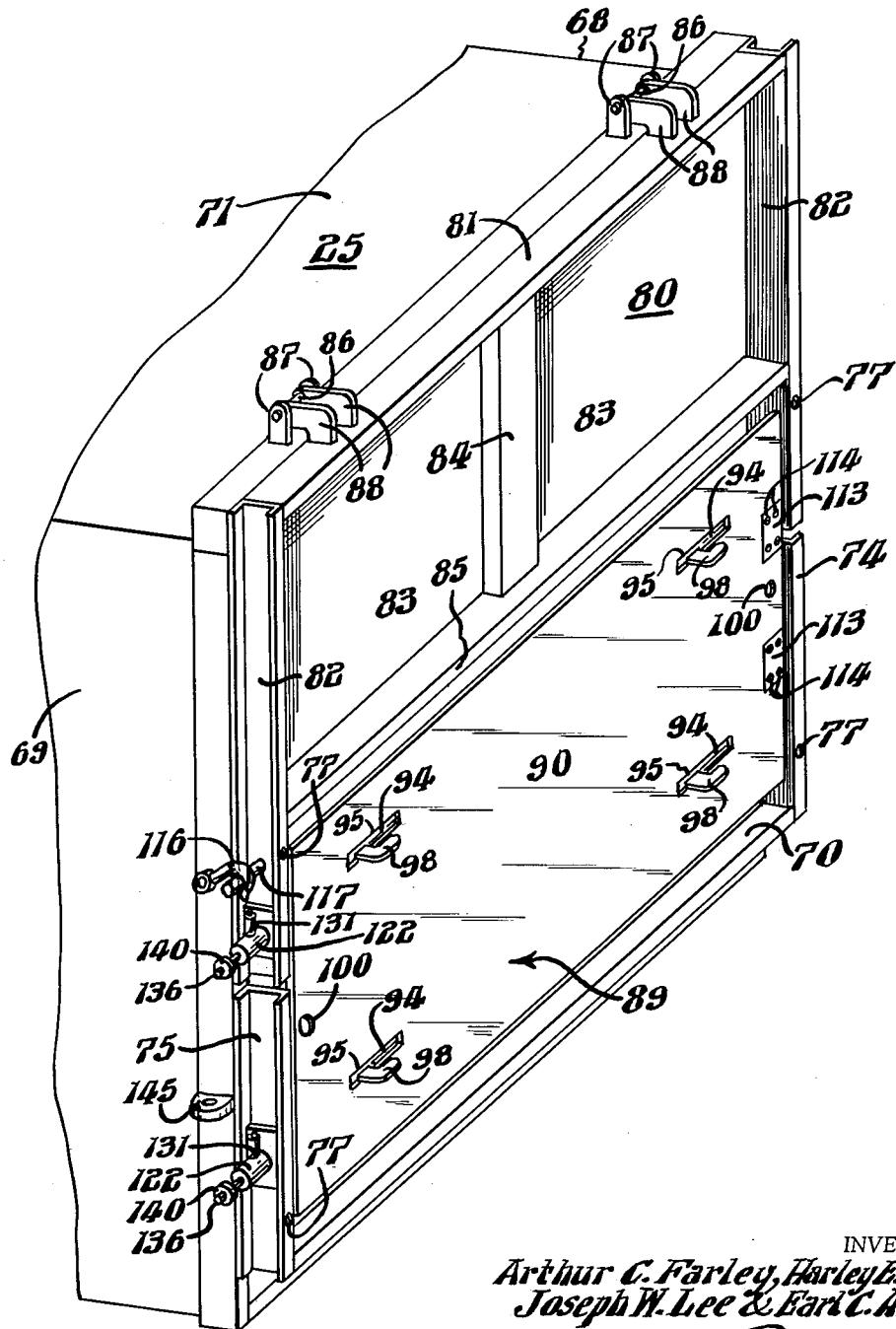
FIGURE 10 is a view of the apparatus in the operational stage thereof shown in FIGURE 9, taken from a different perspective.

At the end of each compaction stroke, including the stage when the transfer container is fully compacted, the apparatus is positioned as shown in FIGURES 1, 2, 3 and 8, and it is seen that the bars 94 are in axial alignment with the stub bars 124, 136 (see FIG. 11). To seal the transfer container 25 at this stage, thereby retaining the compacted load therein, a pointed object is inserted through one opening 120 against pin 111a, and caused to urge the rocker cam 106 counterclockwise so as to draw the articulated pin 102 out of the depression 101. Pin 133 is then lifted out of depression 136a, and at this time, the extending end of the corresponding stub bar 124 is sharply driven manually, thereby forcing the bar to the position shown in FIGURE 12. This action unlocks the transfer plate 89 from the pusher plate assembly 23 by shifting the bar 94 and the integral dogs 98. This unlocking action accomplishes a simultaneous locking of the transfer plate to the transfer container since the stub bar 124 enters the tube 93. The remaining bar 94 is similarly shifted, whereby the apparatus will appear as in FIGURE 9 after this step has been completed (the pusher plate 63 having been withdrawn to a position flush with the frame assembly 20). To hold the transfer plate 89 so locked to the transfer container 25, the pin 133 is dropped into the depression 101a as shown in FIGURE 12. The hooks 142 are released and the transfer container 25 may at this point be hauled away for dumping and replaced by another such container, whereby continuous compaction facilities are maintained. At this stage, the transfer container appears as shown in FIGURE 10.

Upon having transported a full transfer container 25 to a dump, the disposal of the compacted material is accomplished by first releasing the hooks 116 from the lugs 117. Then the lowermost of the bars 94 is shifted to the position shown in FIGURE 11 by first lifting the pin 133 thereof, and then manually driving the stub bar 136 corresponding thereto from the position shown in FIGURE 12 to the position shown in FIGURE 11. This releases the transfer plate 89 from the channel sections 74, 75, and the force of the compacted material will cause the compacted material to dump, while swinging the partial door 80 and the transfer plate 89, which is still attached thereto by the uppermost of the bars 94, away from the body of the transfer container 25 and about the pivot rods 86. The transfer container 25 may then be completely dumped by any of several conventional methods, and returned for reuse in combination with the remaining elements of the apparatus of this invention.

From the above description and the drawings referred to therein, it may therefore be seen that we have provided a compaction and transfer apparatus for compressible refuse including, in combination, a framework, chamber means supported by said framework and comprising a substantially flat bottom wall and a pair of upwardly extending side walls, pusher plate means comprising a generally flat member having dimensions substantially those of the cross-sectional area defined by said bottom and side walls, except for clearance distance, driving means supported by said framework and adapted to support said pusher plate means substantially perpendicular to said bottom wall and side walls and also adapted to drive said pusher plate means through the spatial locus within said chamber means and to cyclically withdraw said pusher plate through said spatial locus; a transfer container having a single end opening formed therein, said opening having dimensions at least as great as the dimensions of the overall area defined by said bottom and side walls of said chamber means, hinged partial closure means adapted to partially cover said container opening, transfer plate means comprising a generally flat member complementally configured to have plane dimensions in all respects not greater than those of said pusher plate means, said partial closure means being irregularly shaped and adapted to complementally, in juxtaposition with said transfer plate means, form a substantially complete closure for said end opening of said transfer container, said pusher plate means being adapted to engage said transfer plate means in coplanar locking engagement therewith, said partial closure means and said transfer container being adapted to releasably engage said transfer plate means, and means mounted on said transfer plate means which is adapted to alternately engage said pusher plate means, and said partial closure means and said transfer container; and means for holding said framework and said transfer container in abutting relationship whereby said partial closure means and said transfer plate means may be placed in closing registration with respect to said transfer container.

It may likewise be seen that said driving means comprises hydraulic actuated cylinder-piston means, a pair of parallel spaced apart elongated drive arms, brace means rigidly connecting said drive arms, means pivotally connecting the free end of said piston to said brace, said cylinder-piston means being oriented mediately parallel to said drive arms and having the end of said cylinder portion of said cylinder-piston means pivotally affixed to said framework, each drive arm having one end thereof pivotally connected to said framework, and the other end thereof pivotally connected to roller carrying means, each drive arm having trunnion means formed centrally thereof, a pair of elongated driven arms each such arm having a centrally spaced journal formed therein complementally to said trunnion means, each of said driven arms being disposed thereby upon the trunnion means of one of said drive arms, each driven arm having one end thereof pivotally connected to said pusher plate means and the other end thereof pivotally connected to roller carrying means, spaced parallel bearing surfaces mounted on said pusher plate means and adapted to engage said roller means of each of said drive arms, spaced parallel bearing surfaces mounted on said framework and adapted to engage said roller carrying means of said driven arms whereby upon the actuation of said cylinder-piston means so as to extend the piston thereof, force is exerted upon said pusher plate means to cause said pusher plate means to substantially traverse said chamber means in one direction, and whereby upon the actuation of said cylinder-piston means so as to withdraw the piston thereof said pusher plate means is caused to substantially traverse said chamber means in the opposite direction.

It may also be seen that said driving means is so oriented that the moment of force exerted by said piston upon extension from said cylinder increases in direct proportion to the amount of extension from said cylinder.

It may further be seen that said pusher plate means has a hollow interior formed therein, faceplate means enclosing said hollow interior, said faceplate means having a first pair of spaced apart slot-like openings formed therein in horizontal alignment, and a second pair of spaced apart slot-like openings formed therein in horizontal alignment, said first and second pair of slot-like openings being vertically spaced part on said face plate means, and wherein said transfer plate means has mounted transversely thereof a pair of spaced apart tube means in substantially parallel horizontal alignment, elongated bar means disposed within each of said tube means, each of said tube means having formed therein a pair of axially spaced apart slot-like openings in horizontal alignment, said spacing being equivalent to the spacing of said horizontally aligned slots in said face plate means, a pair of L-shaped dog means affixed to each of said bar means and extending through said slot-like openings in said tube means, said slot means and said dog means being so dimensioned that the horizontal movement of said bar means is limited thereby, whereby upon alignment of the slot-like openings of said face plate means and said tube means, and the alignment therethrough of said dog means, said transfer plate means may be alternately engaged and released from engagement with said pusher plate means by shifting said rod means between the limiting positions thereof, thereby alternately engaging said dogs with said face plate means and releasing them from said engagement, means mounted on said partial closure means adapted to be engaged by one end of one of said bar means in the position thereof of non-engagement with said pusher plate means, and means mounted on said partial closure means and adapted to be manually actuated so as to cause horizontal movement in alternate opposite directions of said bar means, and further adapted to engage the tube means associated with said bar means upon the movement of said bar means in the direction which causes said transfer plate to be released from said pusher plate, and means mounted on said transfer container and adapted to be engaged by one end of the other of said bar means in the position thereof of non-engagement with said pusher plate means, and means mounted on said transfer container and adapted to be manually actuated so as to cause horizontal movement in alternate opposite directions of said other bar means, and further adapted to engage the tube means associated with said other bar means upon the movement of said other bar means in the direction which causes said transfer plate to be released from said pusher plate.

Having thus described our invention, we claim:

1. A compaction and transfer apparatus for compressible refuse including, in combination, a framework, chamber means supported by said framework and comprising a substantially flat bottom wall and a pair of upwardly extending side walls, pusher plate means comprising a generally flat member having dimensions substantially those of the cross-sectional area defined by said bottom and side walls, and adapted to fit loosely within said chamber, driving means supported by said framework and adapted to support said pusher plate means substantially perpendicular to said bottom wall and side walls and also adapted to drive said pusher plate means through the spatial locus within said chamber means and to cyclically withdraw said pusher plate through said spatial locus; a transfer container having a single opening formed therein, said opening having dimensions at least as great as the dimensions of the overall area defined by said bottom and side walls of said chamber means, hinged partial closure means adapted to partially cover said container opening, transfer plate means comprising a generally flat member complementally configured to said pusher plate means, said partial closure means being adapted to complementally, in juxtaposition with said transfer plate means, form a substantially complete closure for said end opening of said transfer container, said pusher plate means being adapted to engage said transfer plate means in coplanar locking engagement therewith, said partial closure means and said transfer container being adapted to releasably engage said transfer plate means, and means mounted on said transfer plate means which is adapted to alternately engage said pusher plate means, and said partial closure means and said transfer container; and means for holding said framework and said transfer container in abutting relaionship whereby said partial closure means and said transfer plate means may be placed in closing registration with respect to said transfer container.

2. The apparatus of claim 1, wherein said driving means comprises hydraulic actuated cylinder-piston means, a pair of spaced apart elongated drive arms, brace means rigidly connecting said drive arms, means pivotally connecting the free end of said piston to said brace, said cylinder-piston means being oriented mediately parallel to said drive arms and having the end of said cylinder portion of said cylinder-piston means pivotally affixed to said framework, each drive arm having one end thereof pivotally connected to said framework, and the other end thereof pivotally connected to roller carrying means, each drive arm having trunnion means formed centrally thereof, a pair of elongated driven arms each such arm having a centrally spaced journal formed therein complementally to said trunnion means, each of said driven arms being disposed thereby upon the trunnion means of one of said drive arms, each driven arm having one end thereof pivotally connected to said pusher plate means and the other end thereof pivotally connected to roller carrying means, spaced parallel bearing surfaces mounted on said pusher plate means and adapted to engage said roller means of each of said drive arms, spaced parallel bearing surfaces mounted on said framework and adapted to engage said roller carrying means of said driven arms whereby upon the actuation of said cylinder-piston means so as to extend the piston thereof, force is exerted upon said pusher plate means to cause said pusher plate means to substantially traverse said chamber means in one direction, and whereby upon the actuation of said cylinder-piston means so as to withdraw the piston thereof said pusher plate means is caused to substantially traverse said chamber means in the opposite direction.

3. The apparatus of claim 2, wherein said partial closure means and said transfer plate means are in closing registration with said transfer container at substantially the full extension of the piston of said cylinder-piston means.

4. The apparatus of claim 2, wherein said driving means is so oriented that the moment of force exerted by said piston upon extension from said cylinder increases with the amount of extension from said cylinder.

5. The apparatus of claim 1, wherein said pusher plate means has a hollow interior formed therein, faceplate means enclosing said hollow interior, said faceplate means having a first pair of spaced apart slot-like openings formed therein in horizontal alignment, and a second pair of spaced apart slot-like openings formed therein in horizontal alignment, said first and second pair of slot-like openings being vertically spaced apart on said faceplate means, and wherein said transfer plate means has mounted transversely thereof a pair of spaced apart tube means in substantially parallel horizontal alignment, elongated bar means disposed within each of said tube means, each of said tube means having formed therein a pair of axially spaced apart slot-like openings in horizontal alignment, said spacing being equivalent to the spacing of said horizontally aligned slots in said face plate means, a pair of L-shaped dog means affixed to each of said bar means and extending through said slot-like openings in said tube means, said slot means and said dog means being so dimensioned that the horizontal movement of said bar means is limited thereby, whereby upon alignment of the slot-like openings of said faceplate means and said tube means, and the alignment therethrough of said dog means, said transfer plate means may be alternately engaged and released from engagement with said pusher plate means by shifting said rod means between the limiting positions thereof, thereby alternately engaging said dogs with said faceplate means and releasing them from said engagement, means mounted on said partial closure means adapted to be engaged by one end of one of said bar means in the position thereof of non-engagement with said pusher plate means, and means mounted on said partial closure means and adapted to be actuated so as to cause horizontal movement in alternate opposite directions of said bar means and further adapted to engage the tube means associated with said bar means upon the movement of said bar means in the direction which causes said transfer plate to be released from said pusher plate, and means mounted on said transfer container and adapted to be engaged by one end of the other of said bar means in the position thereof of non-engagement with said pusher plate means, and means mounted on said transfer container and adapted to be manually actuated so as to cause horizontal movement in alternate opposite directions of said other bar means, and further adapted to engage the tube means associated with said other bar means upon the movement of said other bar means in the direction which causes said transfer plate to be released from said pusher plate.

References Cited in the file of this patent
UNITED STATES PATENTS

| | | |
|---|---|---|
| 870,023 | Easterling | Nov. 5, 1907 |
| 2,508,877 | Walker et al. | May 23, 1950 |
| 3,082,682 | Kaufman | Mar. 26, 1963 |

UNITED STATES PATENT OFFICE
CERTIFICATE OF CORRECTION

Patent No. 3,129,657                     April 21, 1964

Arthur C. Farley et al.

It is hereby certified that error appears in the above numbered patent requiring correction and that the said Letters Patent should read as corrected below.

Column 1, line 28, for "system" read -- systems --; column 3, line 8, for "cleves" read -- clevis --; column 8, line 16, for "part" read -- apart --; line 72, before "opening" insert -- end --; column 9, lines 15 and 16, for "relaionship" read -- relationship --.

Signed and sealed this 11th day of August 1964.

(SEAL)
Attest:

ERNEST W. SWIDER
Attesting Officer

EDWARD J. BRENNER
Commissioner of Patents